United States Patent

[11] 3,588,196

| [72] | Inventors | Benno Ibo Bonga<br>Onex-Geneva;<br>Hans Rudolf Lehmann, Satigny,<br>Switzerland; Michel Antoine Emile<br>Vuichard, Jurens-Valleiry, France |
|---|---|---|
| [21] | Appl. No. | 688,462 |
| [22] | Filed | Dec. 6, 1967 |
| [45] | Patented | June 28, 1971 |
| [73] | Assignee | Ateliers Des Charmilles S.A.<br>Geneva, Switzerland |
| [32] | Priority | Apr. 28, 1967 |
| [33] | | Switzerland |
| [31] | | 6156/67 |

[54] ELECTRODE LINEAR FEED AND GUIDING MECHANISM FOR ELECTROEROSION MACHINING APPARATUS
8 Claims, 7 Drawing Figs.

[52] U.S. Cl. .................................................. 308/5, 91/165, 92/112

[51] Int. Cl. .......... F16c 1/24, F01b 3/10
[50] Field of Search .................. 308/5, .9; 91/165; 92/112

[56] References Cited
UNITED STATES PATENTS

| 2,946,316 | 7/1960 | Bruehl | 92/112X |
| 3,035,879 | 5/1962 | Hanny et al. | 92/112 |
| 3,131,603 | 5/1964 | Hadekel | 91/165 |
| 3,133,472 | 5/1964 | Zollinger, Jr. | 91/165 |
| 3,168,013 | 2/1965 | Williamson | 308/5X |
| 3,271,086 | 9/1969 | Deffrenne | 308/5 |

*Primary Examiner*—Manuel A. Antonakas
*Attorney*—Hauke, Gifford & Patalidis

ABSTRACT: A hydraulic servomechanism for feeding an electrode toolholder in electroerosion machining apparatus and the like, having self-centering hydrostatic bearings for supporting the electrode toolholder.

INVENTORS
BENNO IBO BONGA
HANS RUDOLF LEHMANN
MICHEL ANTOINE EMILE VUICHARD

ATTORNEYS

ELECTRODE LINEAR FEED AND GUIDING MECHANISM FOR ELECTROEROSION MACHINING APPARATUS

BACKGROUND OF THE INVENTION

Most apparatus for machining workpieces by electroerosion, such as electrochemical machining apparatus and electrical discharge machining apparatus, are usually provided with support and guiding means for an electrode tool, combined with a servosystem and control for linearly feeding the electrode tool towards and away from the workpiece, and for maintaining the electrode tool active face at a substantially precise predetermined distance from the area of the workpiece in the course of being machined by electroerosion. The arrangement for guiding the electrode tool often consists, for example, of a cylindrical rod linearly guided by at least one cylindrical bore forming a bearing surface with the rod. The feed mechanism consists generally of a rotating motor, such as an electrical motor, linearly driving the electrode holder by appropriate motion transmitting and converting means.

Such arrangements for the support and drive of the electrode holder in electroerosion apparatus present the disadvantage of including a plurality of moving parts, having a substantially high inertia, such that it has been found preferable to drive the electrode holder by means of a hydraulic motor, generally consisting of a hydraulic cylinder having a linearly displaceable piston disposed in a longitudinal bore in the cylinder. Such an arrangement presents the advantage of direct drive, without backlash, between the motor and the electrode holder. The direct drive between the motor and the electrode holder, as a result of substantially reducing the inertia of the movable portions of the mechanism, permits to effectuate very small displacements of the electrode holder, in very short periods of time, which presents the great advantage of almost instantaneous and rapid retraction of the electrode holder in the event that a short circuit is detected between the electrode and the machined surface area of the workpiece. However, in order to obtain very precise positioning of the electrode tool with respect to the workpiece it becomes necessary to provide guiding and support means for the electrode holder presenting as little friction and "stickup" as feasible.

The present invention presents the advantage over the prior art of providing a support, guiding and feeding means for an electrode toolholder in an electroerosion machining apparatus having small inertia and practically devoid of friction and "stickup."

SUMMARY OF THE INVENTION

The present invention therefore solves the problems presented by the heretofore available mechanisms for advancing and retracting an electrode in an electroerosion machining apparatus, and for linearly supporting and guiding the electrode holder during motion thereof by mounting the electrode holder on one end of a linearly movable rod attached to a piston member adapted to reciprocate in a bore disposed in a cylinder mounted on a stationary portion of the apparatus. The cylindrical bore is obturated on each end by a closure plate provided with a hydrostatic bearing for supporting and guiding the rod during reciprocation thereof under the action of pressurized fluid being introduced in the cylinder bore and adapted to reciprocate the piston as a result of pressure differential between the two faces of such piston. The hydrostatic bearings are further arranged to cause self-centering of the rod, and the piston is loosely fitted in the cylinder bore such that the rod and the piston are precisely supported and guided while being at all times separated from the stationary portion of the mechanism by a film of bearing fluid.

The many objects and advantages of the present invention will become apparent to those skilled in the art when the following description of some of the best modes contemplated for practicing the invention is read in conjunction with the accompanying drawings wherein:

DESCRIPTION OF THE PREFERRED EMBODIMENTS

The linear advance and guiding mechanism of the present invention may be incorporated in any machine or apparatus where it is desired to linearly displace a tool with respect to a workpiece, by means of a hydraulic servosystem providing positive advance and retraction of the tool, with the further advantage of providing hydrostatic bearing means permitting automatic self-centering of the toolholder with respect to the stationary portion of the machine or apparatus during reciprocation of the holder. The invention has therefore general applications in the machine tool art, although it will be hereinafter explained in detail in particular applications in electroerosion machining apparatus, preferably of the electrical discharge machining kind.

Figure 1:
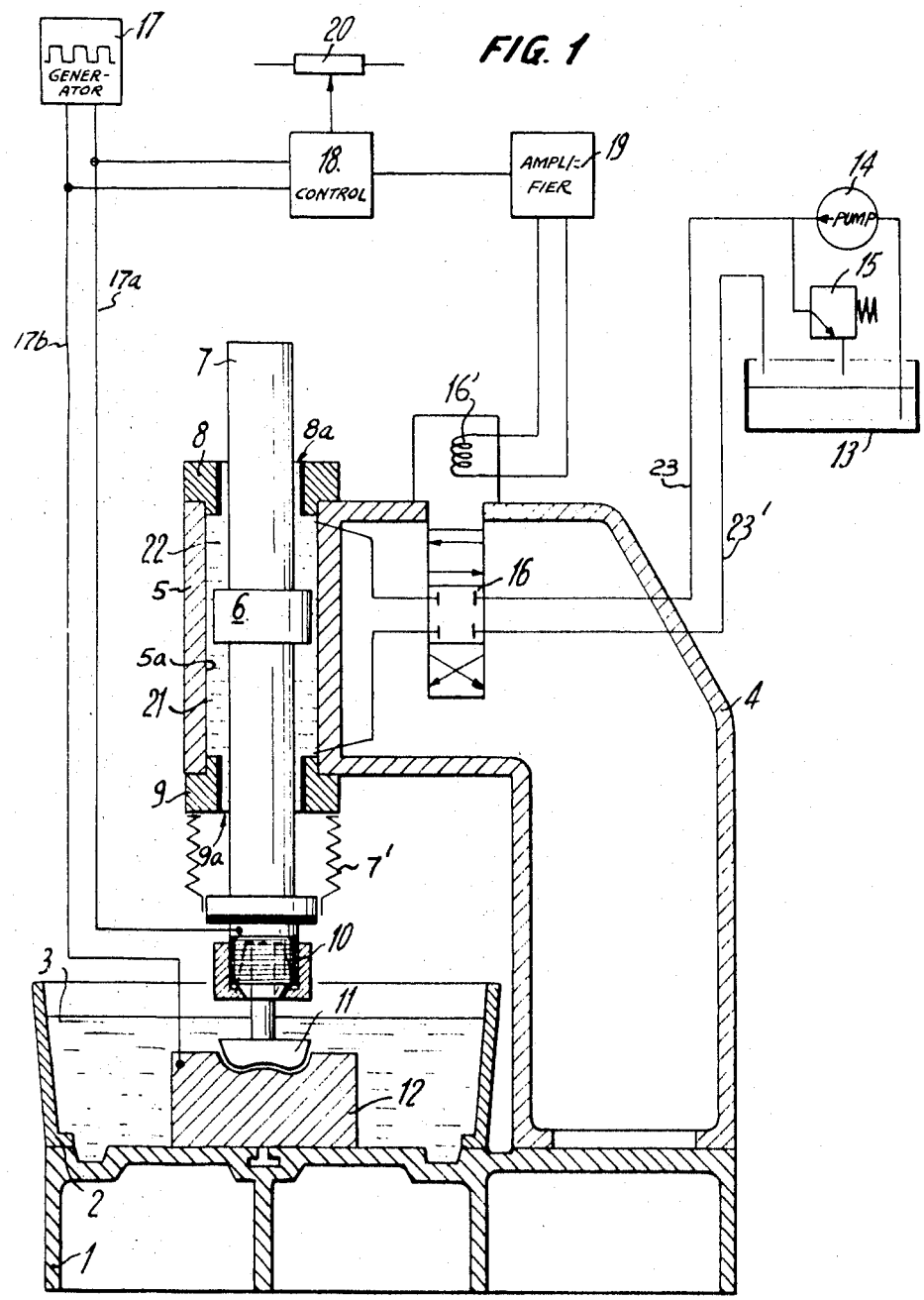
FIG. 1 schematically illustrates partly in section and partly in block diagram form the general arrangement of an electroerosion machining apparatus incorporating the present invention.

Referring now to FIG. 1, a typical electroerosion machining apparatus of the electrical discharge machining kind, EDM, is schematically illustrated, with portions broken away to show the internal construction, as comprising a base 1 supporting a tank or enclosure 2 partly filled with a dielectric liquid 3 of the type particularly convenient for EDM electroerosion machining, such as, for example, kerosene or the like. The base 1 supports a vertically extending post or column 4 having a portion, projecting over the tank 3, adapted to support a feed and guide mechanism for an electrode tool. The feed and guide mechanism comprises a stationary cylinder 5, affixed to the end of the horizontal portion of post 4, and a reciprocable piston member 6 disposed for reciprocation within an internal right cylindrical bore 5a formed within the cylinder 5. Piston 6 is coaxially formed integrally with or, alternately, is affixed to a cylindrical rod member 7 at a portion intermediary the ends of the rod member.

The two ends of the bore 5a in cylinder 5 are each obturated by an end closure member or plate, identified respectively at 8 and 9. Each end closure member or plate is provided with a cylindrical bore, shown at 8a and 9a, forming hydrostatic bearings as hereinafter described in further detail, for supporting and linearly guiding the cylindrical rod member 7 proximate the end portions thereof projecting from the cylinder bore 5a through such end closure members 8 and 9. The lower end of cylindrical rod member 7 is provided with an electrode holder 10 for supporting an electrode tool 11 adapted to machine, by electroerosion, an appropriate surface of a workpiece 12 submerged in the dielectric 3 in tank 2. A bellows sleeve member 7' is preferably disposed around the end portion of cylindrical rod member 7 where it projects from cylinder end closure member 9 to provide protection for the surface of the rod member from projections of dielectric and from the fumes that may cause a superficial attack of the rod surface.

The advance or retraction of the electrode tool 11 is controlled by a hydraulic servomechanism comprising a reservoir 13 filled with an appropriate hydraulic fluid, circulated by a pressurizing and circulating pump 14 provided with pressure regulator 15. Pressurized fluid is supplied by pump 14 to an electrical solenoid-actuated four-way valve 16, via pipe 23, for the purpose to be hereinafter indicated. The machining electrical discharges between the electrode 11 and the workpiece 12 are supplied by a pulse generator 17 connected to the electrode and the workpiece, respectively, by line 17a and line 17b. A control mechanism 18 is electrically connected across the gap between the electrode 11 and the workpiece 12, and is adapted to supply an electrical signal to amplifier 19. The output of amplifier 19 is electrically connected to the solenoid coil 16' of valve 16 and is arranged to controllably cause valve 16 to direct pressurized fluid to either ends of cylinder bore 5a so as to cause displacement of piston 6, and consequently rod member 7 and electrode tool 11 mounted on the end thereof, in an appropriate direction.

Control mechanism 18 is adapted to sense the voltage across the machining gap between the electrode tool 11 and the workpiece 12 and to compare such gap voltage to an adjustable voltage reference 20 such that when the voltage across the gap is higher than the normal machining voltage, which is an indication that the machining gap is too wide and presents a resistance preventing the machining current to reach the value for which the generator 17 and the voltage reference 18 have been set, control mechanism 18, through amplifier 19, controls valve 16 such that fluid is introduced in the upper portion of cylinder bore 5a, or chamber 22, while fluid is exhausted from the lower portion of cylinder bore 5a, which is placed, through valve 16, in fluid communication with return line 23' returning fluid to reservoir 13. Therefore, piston 6 is urged downwardly, as seen in the drawing, downwardly displacing rod member 7, and consequently advancing the active or working face of electrode 11 towards the machined surface of workpiece 12, thereby reducing the width of the gap.

This decrease of the width of the gap causing an increase in the current and consequently a decrease of the voltage across the gap toward a predetermined value corresponding to the current setting of the power supply 17 and the voltage of voltage reference 20, the rate of advance of the electrode tool 11 towards the workpiece 12, as controlled by valve 16, is slowed down so as to continuously maintain a predetermined constant voltage across the gap as continuously monitored by control mechanism 18 and compared to the voltage of voltage reference 20. In the event that the gap is decreased such that there is caused an increase of current flowing thereacross accompanied by a drop of voltage across the gap, which is, to a greater extent, the case in the event of a short circuit between the electrode tool and the workpiece, the decrease of voltage across the gap below the predetermined voltage reference level is sensed by control mechanism 18 which, through amplifier 19, controls four-way valve 16 so as to introduce fluid from chamber 22 in cylinder 5a, resulting in an upward motion of piston 6, rod member 7 and electrode 11.

In this manner, the appropriate gap between the working face of electrode tool 11 and the machined surface of workpiece 12 is automatically maintained to an appropriate predetermined value, resulting in an appropriate rate of feed of the electrode tool toward the workpiece corresponding to the rate of removal of material from the workpiece by electroerosion.

Figure 2:
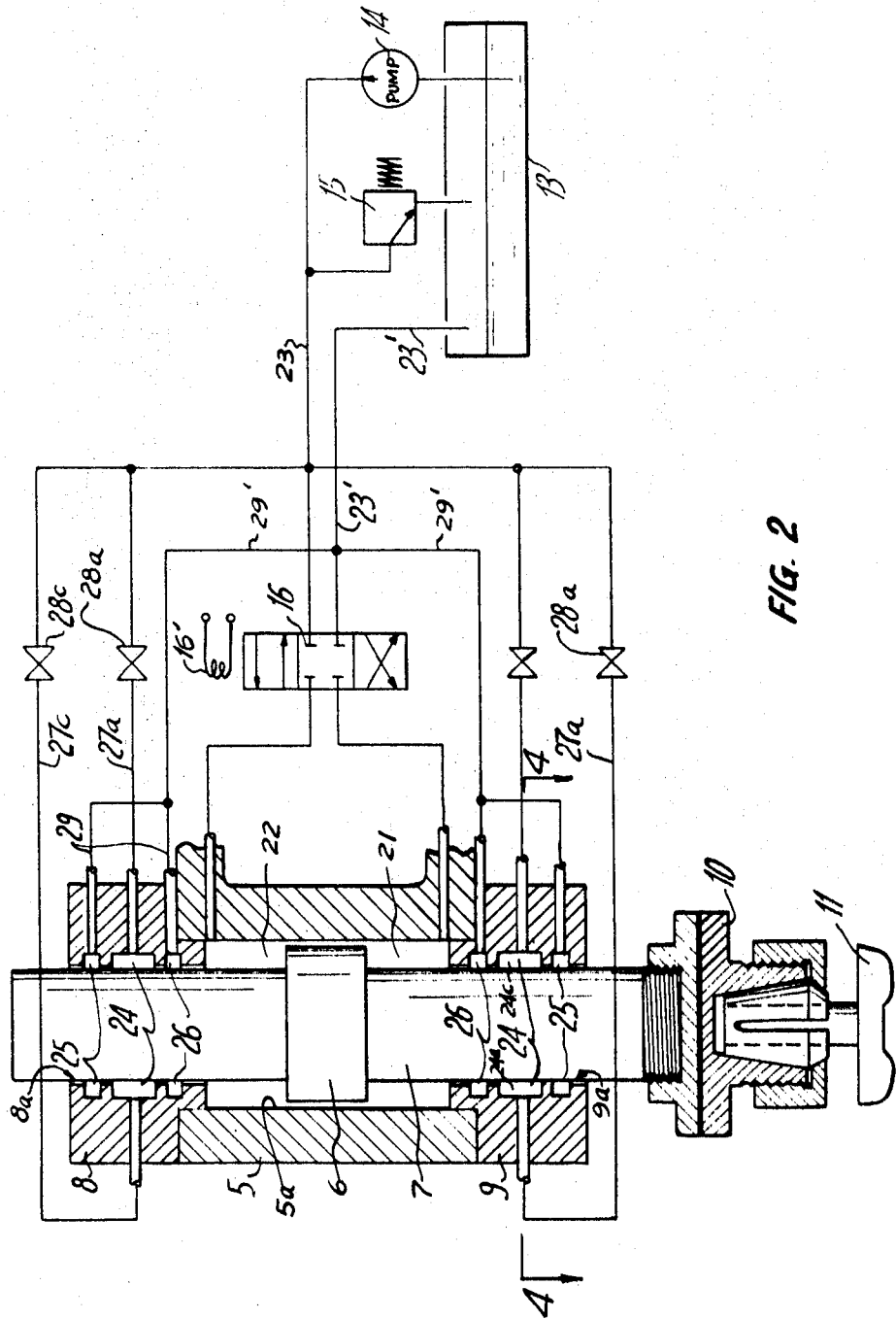
FIG. 2 shows at an enlarged scale the details of the servo feed and hydrostatic support bearing and guiding means, forming parts of the apparatus of FIG. 1, according to a first example of embodiment of the present invention.
Figure 4:
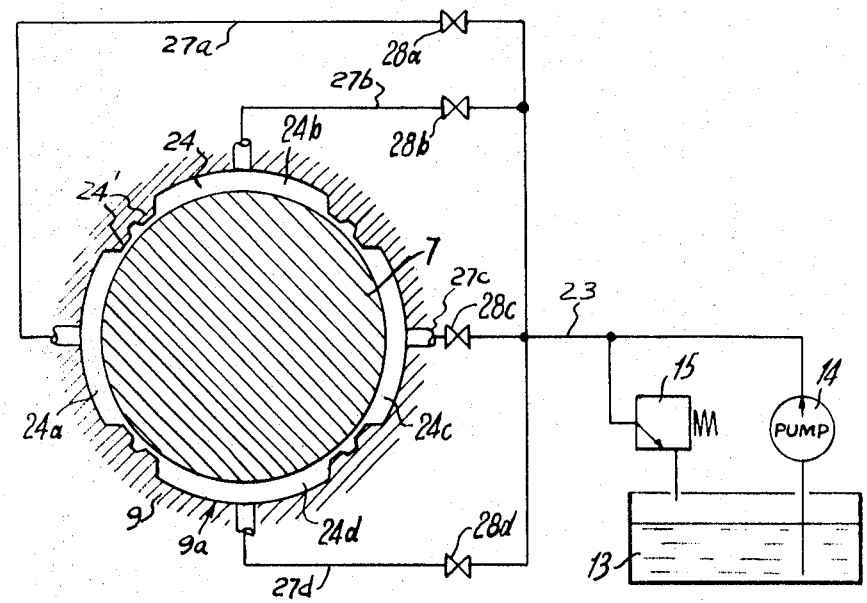
FIG. 4 is a transverse section of one of the hydrostatic bearings of FIG. 2, substantially along lines 4-4 of FIG. 2.

FIG. 2 represents an enlarged view showing in detail an example of construction of the hydrostatic bearings incorporated in the apparatus schematically represented at FIG. 1. FIG. 2 shows the detail of electrode tool 11 supported by electrode holder 10 carried on the end of cylindrical rod member 7, cylindrical rod member 7 being longitudinally reciprocable under the action of differential fluid pressure exerted in chambers 21 and 22 on opposite faces of piston 6 integral with or mounted upon cylindrical rod member 7 intermediary the ends thereof. It can be seen that the outside diameter of piston 6 is somewhat smaller than the inner diameter of the longitudinal bore 5a in cylinder 5 such that the piston is loosely fitted within the cylindrical bore. The cylindrical bore 5a in cylinder 5 is, as previously indicated, obturated on both ends thereof by, respectively, end closure members or plates 8 and 9 each presenting a cylindrical bore generally designated at 8a and 9a, respectively, and defining at each end of the cylindrical bore 5a in cylinder 5 a hydrostatic bearing for the support and guidance of cylindrical rod member 7 proximate both its ends where it projects through the end closure members or plates 8 and 9. Each cylindrical bore 8a or 9a is provided with a main annular groove 24 having a pair of auxiliary annular grooves 25 and 26 each disposed substantially parallel to the main groove on a side thereof. As best seen in FIG. 4 with respect to hydrostatic bearing bore 9a, each groove 24 is divided by radial walls, as shown at 24', into a plurality of equidistant substantially equal partially annular chambers, as shown at 24a, 24b, 24c and 24d which are each open to the peripheral surface of cylindrical rod member 7 at a portion of such surface only, the number of such chambers being at least three in each annular groove 24, four of such chambers being shown in the embodiment illustrated in FIGS. 2 and 4. Each one of the chambers in groove 24 is supplied in pressurized fluid by a plurality of conduits 27 designated individually at 27a, 27b, 27c and 27d, each provided with a restriction 28. Each of the conduits 27a—24d is in turn connected to the pressurizing pump 14 through the restriction 28. In this manner, all the chambers 24d are supplied in fluid at substantially equal pressure which is permitted to leak from each chamber along the peripheral surface of rod member 7 in the space between the inner surface of cylindrical bore 9a and the outer surface of the rod member. The leakage fluid collects in annular grooves 25 and 26 and is returned to the fluid reservoir 13 by way of conduits 29 connected by conduits 29' to return conduit 23'.

The fluid pressure in each chamber 24a—24d formed in annular groove 24 is determined by the orifice size of restrictions 28a—28 and by the amount of fluid flow from each one of the chambers by leakage to the annular are substantially equal in size such that when rod member 7 is substantially concentric within bore 9a or 8a, the fluid pressure in the chambers is equal. If rod member 7 is laterally displaced as a result of a lateral load being applied thereon in a direction substantially normal to the longitudinal axis thereof, the peripheral surface of rod member 7 is consequently radially displaced towards one of the chambers 24a—24d, the leakage of fluid from such chamber, for example chamber 24a, to annular grooves 25 and 26 is decreased, which in turn causes an increase of the pressure of the fluid in the chamber. At the same time, the peripheral surface of rod member 7 is radially displaced away from the chamber in groove 24, for example chamber 24c, which is substantially diametrically opposed to the chamber 24a in which there is an increase of pressure. Consequently, as a result of the increase in separation between the peripheral surface of rod member 7 and chamber 24c, there is an increase of fluid leakage from chamber 24c causing decrease of fluid pressure in chamber 24c. This causes a force upon rod member 7 which, coupled with the diametrically opposed force caused by the increase of pressure of the fluid in the chamber 24a, urges rod member 7 radially towards chamber 24c and away from chamber 24a. It can thus be seen that the variations of fluid pressure in the several chambers are such that the fluid pressure in each chamber varies upwardly in function of the closeness of rod member 7 to each chamber, resulting in rod member 7 being constantly substantially centered within each of the hydrostatic bearings 9a and 8a, irrespective of any lateral load or radially directed external force applied to the rod member 7.

Figure 3:
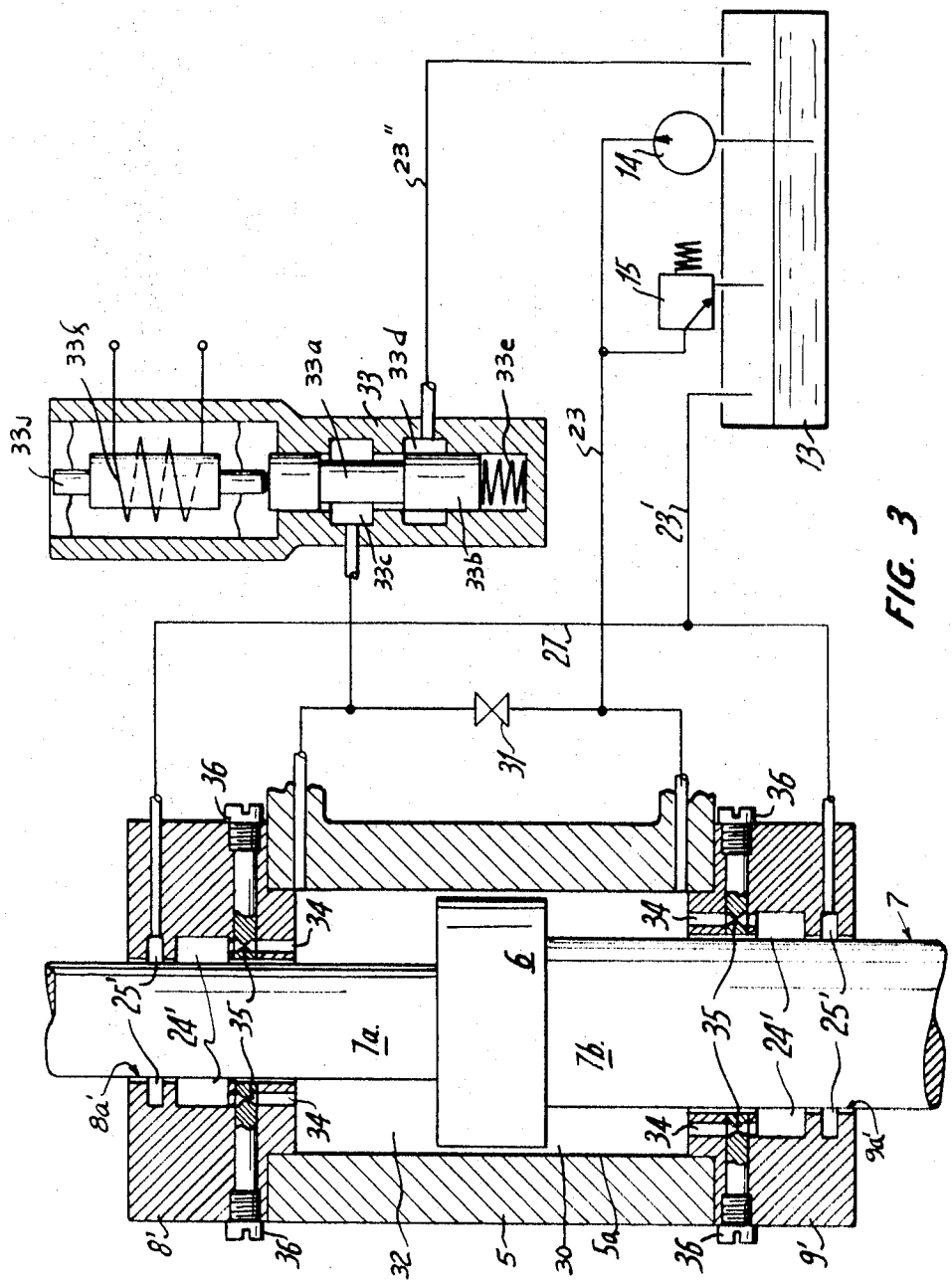
FIG. 3 represents a modification of the arrangement of FIG. 2.

FIG. 3 illustrates a modification of the electrode servo feed and guiding mechanism precedently described, the servo feed mechanism of such modification being principally characterized by a structure for piston 6 and rod member 7 forming unequal piston areas to be presented to the effect of the pressurized hydraulic fluid in cylinder chambers 30 and 32. This is accomplished by having the piston rod member 7 made of an upper rod portion 7a which is, as shown, of a smaller diameter than lower rod portion 7b. The hydraulic fluid, normally contained in reservoir 13 and pressurized by pump 14, is supplied directly by line 23 to chamber 30 defined in cylinder bore 5a of hydraulic cylinder 5 between the bottom face of piston 6 and cylinder closure member 9'. Pressurized fluid is also supplied through a restriction 31 to chamber 32 disposed in cylinder bore 5a between the upper face of piston 6 and the upper cylinder closure member 8'. Chamber 32 is adapted to be connected to return line 23'' through an electromagnetic valve 33. Consequently, the pressure of fluid in chamber 30 is equal to the fluid pressure as supplied by pump 14 and as regulated by regulator 15, while the pressure in chamber 32 is dependent upon whether or not valve 33 opens chamber 32 to return line 23''.

The electrode, not shown, mounted at the bottom of rod portion 7b, tends to be displaced toward the top of the drawing under the action of the pressure exerted by the fluid in chamber 30, which has a substantially constant value, and is subjected to a variable pressure downwardly directed, resulting from the variable pressure of the fluid in chamber 32. Consequently, by controlling the pressure of the fluid in chamber 32 to appropriate values, the electrode may be displaced downwardly, upwardly or held stationary. Electromagnetic valve 33 is of conventional construction and is provided with a spool 33a having a land 33b adapted to control the passage of fluid from an inlet groove 33c connected to cylinder chamber 32 to an outlet groove 33d connected to fluid return line 23''. A spring 33e normally biases spool 33a in the direction that causes land 33b to prevent inlet groove 33c and outlet groove 33d from communicating. When an electric signal, in the form of, for example, a variable electrical current, is circulated through valve control coil 33f, plunger rod 33j is displaced downwardly, as seen in the drawing, thereby displacing spool 33a downwardly against the biasing action of spring 33e, thereby placing inlet groove 33c and outlet groove 33d in fluid communication and increasing the flow of fluid from inlet groove 33c to outlet groove 33d as a function of the displacement of the spool with the result that the fluid pressure in chamber 32 is reduced in proportion to the intensity of the current circulating through control coil 33f.

The hydraulic cylinder of the servomechanism of FIG. 3 may also be provided with appropriate hydrostatic bearings adapted to support rod portion 7a and 7b where each projects from cylinder bore 5a through end closure plates or members 8' and 9' at both ends of the bore. The hydrostatic bearings formed in bores 8a' and 9a', supporting and centering respectively rod portion 7a and 7b, are of identical construction and each comprises an annularly disposed groove 24', divided by appropriate radial walls in a plurality of partly annular chambers, as previously explained in detail with respect to the embodiment of FIGS. 2 and 4. A parallel continuous annular groove 25' is adapted to collect the fluid leaking from the chambers in groove 24' and is connected to return through conduit 23'. Each of the chambers in groove 24' is individually supplied in pressurized fluid by means of a passageway 34 leading directly into the cylinder chamber 30 or 32 and presenting a restricted orifice 35 adjustable by way of a setscrew 36. Each of the set screws 36 is normally adjusted such that rod portions 7a and 7b, respectively, are centered in the hydrostatic bearing in bores 8a' and 9a' when there is no lateral load applied to the rod member 7. The operation of the hydrostatic bearings of FIG. 3 is identical to the operation of the hydrostatic bearings of FIGS. 2 and 4.

Figure 5:
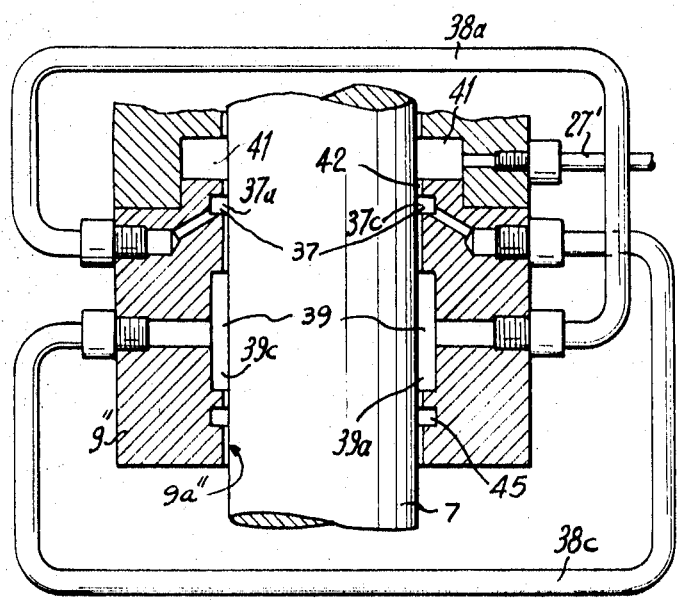
FIG. 5 is a detailed longitudinal sectional view of a further modification of hydrostatic bearing according to the present invention.

FIG. 5 schematically illustrates, in longitudinal section, a further modification of a hydrostatic bearing according to the principles of the present invention. In the embodiment of FIG. 5, each hydrostatic bearing as, for example bore 9a'' in cylinder end closure plate or member 9'', comprises a first annular groove 41 disposed in or dependent from closure end plate or member 9''. Groove 41 is supplied via line 27', with pressurized hydraulic fluid being normally allowed to leak through clearance 42 between the peripheral surface of rod member 7 and of the inner surface of hydrostatic bearing bore 9a'' in end plate member 9''. The fluid leaking through clearance 42 is thus supplied to an annular groove 37 having appropriate radial walls forming a plurality of chambers open to the peripheral surface of rod member 7, as previously explained with respect to the preceding embodiments. Two of such chambers, diametrically opposed, are shown at 37a and 37c. A third annular groove 39 is disposed also in hydrostatic bearing bore 9a'' in end plate member 9'', and is divided by radial walls in a plurality of chambers, equal in number to the chambers in groove 37. Two diametrically opposed chambers 39a and 39c are thus shown in groove 39, the area of such chambers being open to the peripheral surface of rod member 7 being substantially greater than the area of each of the chambers of groove 37. Chamber 37a is connected to chamber 39a, diametrically opposed thereto except for the fact that chamber 37a is in groove 37 and chamber 39a is in groove 39, by means of a conduit 38a, while chamber 37c is connected to chamber 39c, diametrically opposed thereto, by means of conduit 38c. FIG. 5 shows only two chambers in each groove, but it is obvious that as previously indicated, there is at least three chambers in each groove, one chamber of one groove being diametrically opposed to the corresponding chamber of the other groove, disregarding the small longitudinal nonalignment between the grooves. Consequently, in the example illustrated in FIG. 5, there is a total of four chambers in each groove, two of which are only shown in the drawing. The fourth annular groove, shown at 45, is a return groove for collecting leakage fluid.

In the event that a lateral load is applied upon the electrode mounted on the end of rod member 7, rod member 7 tends to be laterally, or radially, displaced within the hydrostatic bearing bore 9a'', for example towards the left, as seen in the drawing. Such a radial displacement of rod member 7 causes a decrease of leakage of fluid from annular groove 41 into chamber 37a through clearance 42, while causing a corresponding increase of fluid leakage from groove 41 to chamber 37c. Consequently, there is caused an increase of fluid pressure in chamber 37c and a decrease of pressure of the fluid in chamber 37a. Chamber 37c being connected by conduit 38c to chamber 39c, there is an increase of pressure of the fluid delivered to chamber 39c, while there is a decrease of pressure in chamber 39a, connected through conduit 38a to chamber 37a. The individual areas presented by the chambers in groove 39 to the peripheral surface of rod member 7 being much larger than the individual areas presented by the chambers in groove 37, the increase of pressure in chamber 39c accompanied by the decrease of pressure of the fluid in chamber 39a causes rod member 7 to be displaced toward the right, with the result that rod member 7 is at all times substantially self-centered within hydrostatic bearing bore 9a'', irrespective of the direction of lateral load being applied to the rod member.

Instead of interconnecting the chambers in groove 37 with the chambers in groove 39, one by one, by means of external conduits such as 38a and 38c shown in FIG. 5, such connection may be effected by means of interconnecting grooves formed directly in the surface of the hydrostatic bearing bore in the end plate member. An example of such an arrangement is shown in the planar development representation of FIG. 6 illustrating schematically a hydrostatic bearing having four chambers 37a, 37b, 37c and 37d being, one by one, interconnected with chambers 39a, 39b, 39c and 39d, such that chamber 37a is connected to chamber 39a, diametrically opposed thereto, by means of groove 38a, chambers 37b and 39b are interconnected by groove 38b, and so on.

Figure 7:
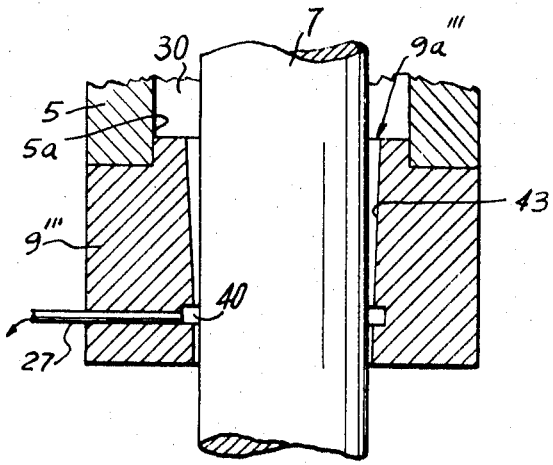
FIG. 7 is a further modification of a hydrostatic bearing according to the present invention.

FIG. 7 represents schematically a further modification of a hydrostatic bearing according to the present invention. In such an arrangement, the hydrostatic bearing bore 9a''' is shaped as a substantially frustoconical bore formed in end plate member 9''', as shown at 43, and disposed such that piston rod member 7 projects therethrough from bore 5a in hydraulic cylinder 5. Frustoconical bore 43 acts as a self-centering bearing supplied in hydraulic fluid directly from chamber 30 in cylinder 5a, the greater diameter portion of frustoconical bore 43 being directly open to chamber 30. The leakage of fluid past frustoconical bore 43 is collected in continuous annular groove 40 formed in end plate member 9''', groove 40 being connected to the hydraulic fluid return by means of conduit 27.

The hydrostatic bearing formed by frustoconical bore 43, in spite of its great simplicity, provides substantial self-centering support to rod member 7. When rod member 7 is substantially centered in frustoconical bore 43, there results a substantially equal leakage of fluid from motor chamber 30 into groove 40 resulting in a substantially even pressure being radially exerted upon the peripheral surface of rod member 7. However, if rod member 7 is radially displaced as a result of a lateral load being applied thereto, the fluid leakage path between the peripheral surface of the rod member and the inner surface of frustoconical bore 43 is locally narrowed as a result of rod member 7 being forced locally in closer proximity with the bore surface. This causes a local decrease in fluid leakage in turn locally causing corresponding increase in fluid pressure exerted radially upon the peripheral surface of rod member 7, while a locally diametrically opposed increase in fluid leakage causes a diametrically opposed decrease in the fluid pressure radially applied to the peripheral surface of the rod member 7. The differential pressure thus exerted radially upon rod member 7 urges the rod member back to its centered original position.

Figure 6:
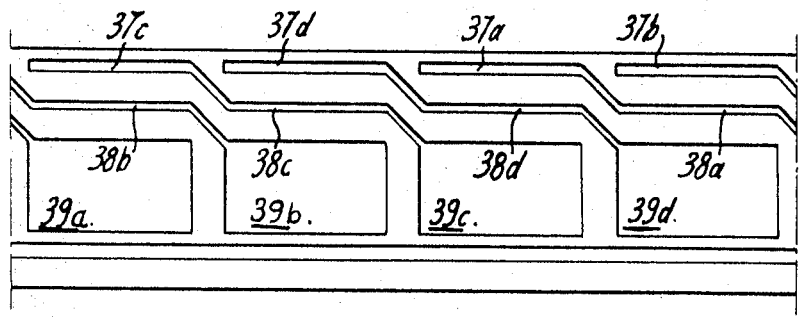
FIG. 6 shows schematically the planar development of the inner cylindrical surface of the hydrostatic bearing of FIG. 5.

The principal advantages of the embodiments of the invention shown at FIGS. 5 and 6 are that the structural arrangement of the diverse components illustrated and hereinbefore described results in self-cleaning self-centering hydrostatic bearings requiring no calibrated fluid flow orifices as is the case in conventional hydrostatic bearings or in the embodiment illustrated herein at 35 in FIG. 3. Such calibrated orifices are somewhat costly and difficult to manufacture, and are delicate to adjust with precision in view of the small fluid flow rates that they are intended to control; they are easily obturated by impurities or solid particles in suspension in the fluid. The embodiment of FIG. 6 has the additional advantage of great simplicity resulting from the suppression of external conduits, piping and fittings for the hydraulic fluid system providing fluid to the hydrostatic bearings.

It is obvious that the several modifications of the present invention as herein disclosed are not to be limited to the exact arrangement of parts shown in the accompanying drawings or as described, as various changes in details of construction may be resorted to without departing from the spirit and scope of the invention.

We claim:

1. In a fluid operated servo feed mechanism comprising a cylinder, a piston reciprocable in said cylinder by the action of pressurized fluid controllably introduced into said cylinder and a cylindrical rod supporting said piston projecting from said cylinder on both ends thereof, the combination of:
said piston loosely fitting said cylinder; and
a hydrostatic bearing for supporting said cylindrical rod at each end of said cylinder by way of a fluid film and for substantially opposing lateral loads imposed upon said rod normally to the longitudinal axis thereof, said hydrostatic bearing comprising:
a member closing said cylinder on each end thereof and having a bore loosely accepting said rod therethrough;
a generally annular space in said bore coaxially surrounding a portion of the outer surface of said rod;
a source of pressurized fluid;
means for controllably introducing fluid from said source into said cylinder for displacing said piston;
means for introducing fluid from said cylinder to said annular space;
a fluid return annular groove on the bore of said member for recovering fluid leaking from said annular space;
conduit means between said annular groove and said source of pressurized fluid for returning said fluid to said source; and
means for radially differentially varying the pressure of the fluid in said annular space for opposing lateral displacement of said rod caused by lateral loads imposed thereon.

2. The hydrostatic bearing of claim 1 wherein said generally annular space is defined by said bore being substantially frustoconical with its largest diameter end being disposed toward said cylinder and being supplied in fluid from said cylinder and its smaller diameter end being proximate said fluid return annular groove.

3. In a fluid operated servo feed mechanism comprising a cylinder, a piston reciprocable in said cylinder by the action of pressurized fluid controllably introduced into said cylinder and a cylindrical rod supporting said piston projecting from said cylinder on both ends thereof, the combination of:
said piston loosely fitting said cylinder; and
a hydrostatic bearing for supporting said cylindrical rod at each end of said cylinder by way of a fluid film and for substantially opposing lateral loads imposed upon said rod normally to the longitudinal axis thereof, said hydrostatic bearing comprising:
a member closing said cylinder on each end thereof and having a bore loosely accepting said rod therethrough;
means in said bore defining a generally annular space coaxially surrounding a portion of the outer surface of said rod;
a source of pressurized fluid;
means for controllably introducing fluid from said source into said cylinder for displacing said piston;
means for introducing fluid from said source to said annular space;
a fluid return annular groove on the bore of said member for recovering fluid leaking from said annular space;
conduit means between said annular groove and said source of pressurized fluid for returning said fluid to said source; and
means for radially differentially varying the pressure of the fluid in said annular space for opposing lateral displacement of said rod caused by lateral loads imposed thereon;
wherein said generally annular space comprises;
a second annular groove formed in said bore;
radial walls in said second groove defining at least three equidistant substantially equal chambers radially disposed about said rod; and
means for individually supplying each of said chambers with fluid at equal pressure whereby the pressure of the fluid in any one chamber is increased as a result of lateral displacement of said rod toward said chamber and decreased as a result of lateral displacement of said rod away from said chamber.

4. The hydrostatic bearing of claim 3 further comprising:
a third annular groove formed in said bore;
radial walls in said third annular groove defining chambers each diametrically opposed to each chamber of said second annular groove; and
conduit means placing said opposed chambers in fluid communication for supplying the chamber of the third annular groove with fluid from the chamber of the second annular groove.

5. The hydrostatic bearing of claim 4 wherein the chambers of said third annular groove each defines an area open to the outer surface of said rod greater than each of the areas defined by the chambers of said second annular groove.

6. The hydrostatic bearing of claim 4 further comprising:
an additional annular continuous groove formed in said bore proximate said second annular groove; and
conduit means placing said continuous groove in communication with said source of fluid;
said continuous groove being placed in fluid communication with said second annular groove by longitudinal leakage of fluid in said annular space whereby the pressure of the fluid flowing into each of said chambers of said second annular groove is inversely proportional to the proximity between the outer surface of said rod and the surface of said bore dependent from the lateral displacement of said rod.

7. The hydrostatic bearing of claim 4 wherein said conduit means placing said opposed chambers in fluid communication are grooves formed on said bore between said opposed chambers.

8. The hydrostatic bearing of claim 3 wherein the means for individually supplying each of said chambers with fluid is a fluid passageway placing each of said chambers in communication with said cylinder.

UNITED STATES PATENT OFFICE
CERTIFICATE OF CORRECTION

Patent No. 3,588,196      Dated June 28, 1971

Inventor(s) BENNO IBO BONGA ET AL

It is certified that error appears in the above-identified patent and that said Letters Patent are hereby corrected as shown below:

IN THE SPECIFICATION

Column 4, line 28, change "27a - 24d" to - - 27a - 27d - - line 30, before "are" cancel "24d" and insert - - 24a - 24d - - line 39, change "28a - 28" to - - 28a - 28d - - line 40, after "annular" insert - - grooves 25 and 26. The orifices in restriction 28a - 28d - -

Column 6, line 28, hyphenate "non-alignment"

Signed and sealed this 16th day of May 1972.

(SEAL)
Attest:

EDWARD M. FLETCHER, JR.      ROBERT GOTTSCHALK
Attesting Officer      Commissioner of Patents